US008939273B2

(12) United States Patent
Thompson et al.

(10) Patent No.: US 8,939,273 B2
(45) Date of Patent: Jan. 27, 2015

(54) HIGH SPEED SERVO LANER

(71) Applicant: Delkor Systems, Inc., St. Paul, MN (US)

(72) Inventors: Ronald Scott Thompson, White Bear Lake, MN (US); Adam Koller, Minneapolis, MN (US); Todd Thomas Palm, Mounds View, MN (US)

(73) Assignee: Delkor Systems, Inc., St. Paul, MN (US)

( * ) Notice: Subject to any disclaimer, the term of this patent is extended or adjusted under 35 U.S.C. 154(b) by 0 days.

(21) Appl. No.: 13/969,988

(22) Filed: Aug. 19, 2013

(65) Prior Publication Data
US 2014/0060998 A1 Mar. 6, 2014

Related U.S. Application Data

(60) Provisional application No. 61/695,554, filed on Aug. 31, 2012.

(51) Int. Cl.
*B65G 47/68* (2006.01)
*B65G 47/12* (2006.01)
*B65G 47/46* (2006.01)
*B65G 47/64* (2006.01)
*B65G 47/71* (2006.01)
*B65G 47/28* (2006.01)

(52) U.S. Cl.
CPC .............. *B65G 47/46* (2013.01); *B65G 47/648* (2013.01); *B65G 47/71* (2013.01); *B65G 47/28* (2013.01)
USPC ...................... 198/442; 198/367.1; 198/459.1

(58) Field of Classification Search
USPC .................................. 198/459.1, 367.1, 442
See application file for complete search history.

(56) References Cited

U.S. PATENT DOCUMENTS

| | | | | |
|---|---|---|---|---|
| 4,462,516 A | * | 7/1984 | Guerzoni | 198/427 |
| 7,357,243 B2 | * | 4/2008 | Weaver et al. | 198/437 |
| 7,658,274 B2 | * | 2/2010 | Mignano | 198/442 |
| 2006/0021852 A1 | * | 2/2006 | Cull et al. | 198/445 |
| 2007/0000570 A1 | * | 1/2007 | Lechner et al. | 141/144 |
| 2011/0153614 A1 | * | 6/2011 | Solomon | 707/740 |

* cited by examiner

*Primary Examiner* — Gene Crawford
*Assistant Examiner* — Lester Rushin
(74) *Attorney, Agent, or Firm* — Vidas, Arrett & Steinkraus, P.A.

(57) ABSTRACT

A high speed servo laner apparatus and system includes an entrance to the laner which receives products from an upstream processing line. A pivoting guide has a distal end attached to the entrance and a proximal end attached to a movable portion. At least one pacing screw is also attached to the moveable portion. The at least one pacing screw includes a thread, which has a pitch and radius configured to accommodate passage of a unit of product between two axially adjacent portions of the thread.

18 Claims, 4 Drawing Sheets

HIGH SPEED SERVO LANER

CROSS-REFERENCE TO RELATED APPLICATIONS

This Application claims the benefit of and priority to U.S. Provisional Application No. 61/695,554, filed Aug. 31, 2012, the entire contents of which are herein incorporated by reference.

TECHNICAL FIELD

This disclosure relates to conveyance of product along a manufacturing line. More specifically, the disclosure describes a high-speed laner that directs product flow within a manufacturing line.

BACKGROUND

Laners are well-known machines commonly employed in product processing. Laners distribute product to various channels of the manufacturing line. Some laners receive product flow from a single upstream channel and divide product flow into multiple downstream lanes. Such machines often comprise a fixed upstream portion and a movable downstream portion. The upstream portion receives product inflow. The movable downstream portion distributes the product on a moving conveyor belt.

Ideally, laners would operate without slowing down product flow. But product stability can be compromised during lane changes because the movable portion of the laner has a tendency to swipe product exiting the laner. Products may be damaged or misaligned following contact with the laner. Misaligned products can jam the processing machines. Moreover, many existing laners fail to provide uniform spacing between advancing product containers. As a consequence such laners operate at relatively slow speeds and may be prone to jamming and/or other inefficiencies.

In light of the above, a need exists to provide a high-speed laner, which provides uniform product spacing and that can reposition the downstream portion of the laner without contacting product exiting the laner and without interrupting product flow.

SUMMARY

In general, this disclosure describes a laner that distributes product without interrupting product flow during repositioning of the laner. More specifically, the inventive laner includes a movable downstream portion that has a servo-driven pacing screw which adjusts product conveyance to maintain proper product spacing and alignment.

The details of one or more aspects of the disclosure are set forth in the accompanying drawings and the description below. Other features, objects, and advantages will be apparent from the description and drawings, and from the claims.

DETAILED DESCRIPTION

While this invention may be embodied in many different forms, there are described in detail herein specific examples of the invention. This description is an exemplification of the principles of the invention and is not intended to limit the invention to the particular examples illustrated.

Figure 1:
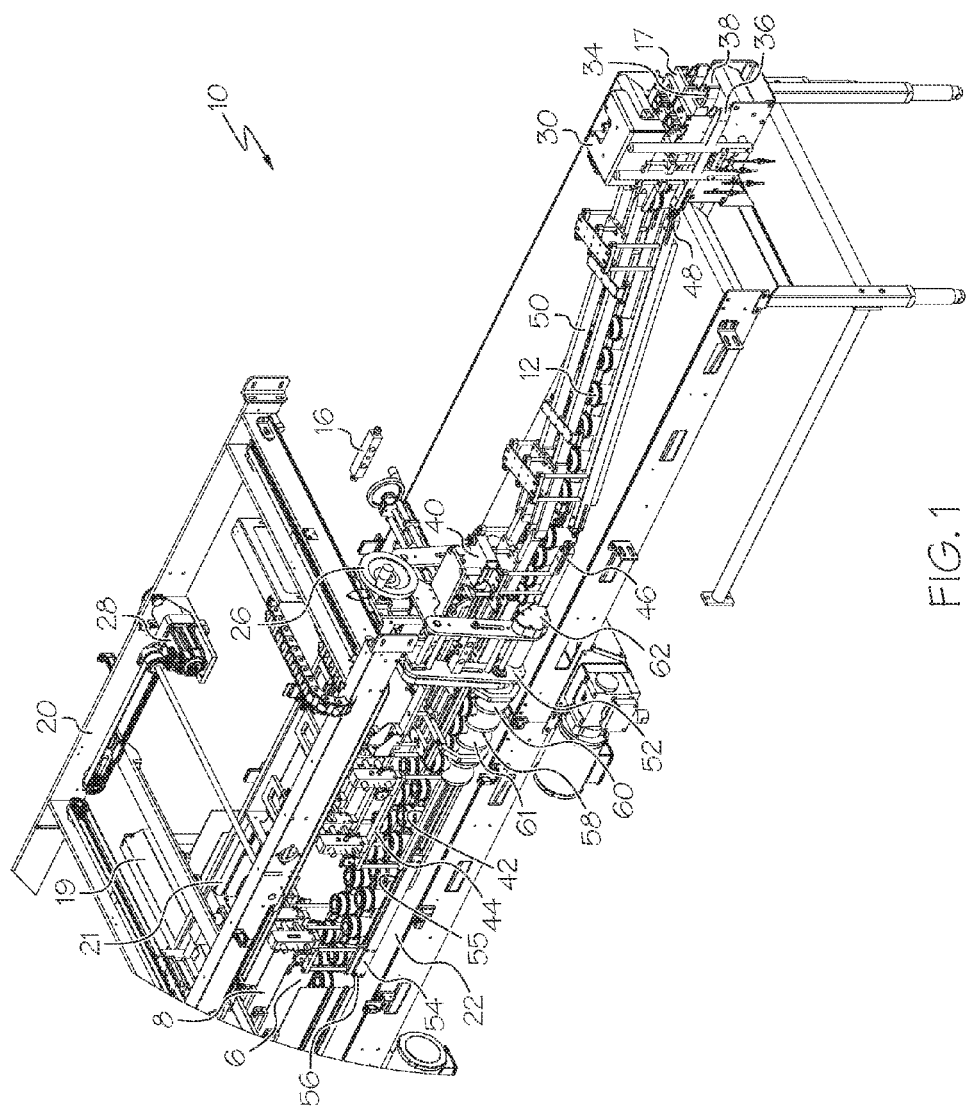
FIG. 1 is a perspective view of an embodiment of the inventive laner.

Referring to the figures, FIG. 1 shows one embodiment of the inventive high-speed servo laner 10. In FIG. 1, product 12 flows through laner 10 from right to left.

For purposes of this disclosure product 12 comprises any product or container thereof of any size, shape or configuration capable of being advanced through a laner 10. In at least one embodiment, each example of product 12 are tapered diameter containers such as those commonly used for containing yogurt and/or other dairy products.

Product 12 enters laner 10 at an entrance 17 and exits the laner 10 at an exit 19. For purposes of this disclosure, entrance 17 is considered upstream or proximal to exit 19. Likewise, exit 19 is considered downstream or distal to entrance 17. For purposes of this disclosure, "right" and "left" sides of laner 10 will be referenced by facing in the direction of product travel. Thus, the left side of laner 10 is in the foreground of FIG. 1. Likewise, the right side of laner 10 is in the background of FIG. 1.

The embodiment of laner 10 shown in FIG. 1 has just completed a move to the left most outflow lanes 6, 8. In at least one embodiment, the laner 10 comprises a rectangular open frame 20 rigidly mounted above a conveyor belt 22. A fixed upstream portion 30 of laner 10 receives product 12 from a manufacturing line (not shown). In some embodiments, the fixed upstream portion 30 is a housing or frame that defines an open channel through which product 12 passes. In at least one embodiment, the fixed upstream portion 30 is held substantially fixed relative to the rectangular open frame 20.

A movable downstream portion 40 deposits product 12 onto conveyor belt 22. The movable downstream portion 40 is constructed and arranged to accommodate and transport a plurality of product 12. In some embodiments, the movable downstream portion 40 comprises a corral-like structure that is open at the bottom, allowing product 12 to be supported by an underlying conveyor belt 22. In an alternative embodiment, the movable downstream portion 40 comprises a bottom surface of rollers or a belt that supports product 12.

Movable downstream portion 40 moves relative to the fixed upstream portion 30. Any suitable means may be used to move the movable downstream portion 40. In some embodiments, a robotic arm controls the movement of the movable downstream portion 40. In an alternative embodiment, movable downstream portion 40 is mounted on a pair of orthogonal rails that slide relative to one another. In some embodiments, servo-driven motors control the movement of movable downstream portion 40. In another embodiment, the movable downstream portion 40 is moved by a mechanical engagement with a cam.

A pivoting guide lane 50 connects the fixed upstream portion 30 of laner 10 to the movable downstream portion 40 of laner 10. In some embodiments, the pivoting guide lane 50 is hingedly attached to the fixed upstream portion 30 of laner 10 by a proximal couple 48 and to the movable downstream portion 40 of laner 10 by a distal couple 46. The pivoting guide lane 50 directs product 12 from the fixed upstream portion 30 of laner 10 to the movable downstream portion 40 of laner 10, enabling product 12 to move from the fixed upstream portion 30 of laner 10 to the movable downstream portion 40 of laner 10 during movement of the movable downstream portion 40 of laner 10.

In some embodiments, the movable downstream portion 40 of laner 10 is suspended from open frame 20 on a rail 21 that is oriented parallel to the direction of travel of conveyor belt 22. A lateral servo motor 26 controls the movement of rail 21 within open frame 20 in the direction perpendicular to the direction of travel of conveyor belt 22. A stream-wise servo motor 28 controls the movement of the movable downstream portion 40 of laner 10 along rail 21 in the direction parallel to the direction of travel of conveyor belt 22. In this way, motors 26, 28 control the position of the movable downstream portion 40 of laner 10 relative to the rolling conveyor belt 22.

In at least one embodiment, product 12 is fed into the fixed upstream portion 30 of laner 10 through one or more than one infeed lanes (not shown). As indicated above, product 12 can be any type of product or product container such as: tapered cups, bottles, sleeved product, etc. In embodiments with multiple infeed lanes, all upstream lanes may contain the same product 12 or different infeed lanes may contain different products. For example, one flavor of a canned product may be in one upstream lane and a second flavor may be in a second upstream lane.

In some embodiments, product 12 enters the fixed upstream portion 30 of the laner 10 by one or more infeed lanes. Product enters the fixed upstream portion 30 of the laner 10 at a random rate. A central divider 34 within the fixed upstream portion 30 of laner 10 splits the infeed lane 32 into two parallel lanes: a left lane 36, and a right lane 38. In an alternative embodiment, a single line of product flow is maintained throughout laner 10 as product 12 flows from entrance 17 to exit 19 of laner 10. In some single line embodiments, there is no central divider 34. In such embodiments, there is one lane of product flow throughout laner 10 rather than two lanes 36, 38. In another embodiment, two infeed lanes (not shown) are directly connected to lanes 36, 38 so that one flavor of product is delivered to lane 36 and another flavor of product is delivered to lane 38.

The two lanes 36, 38 convey product 12 into the pivoting guides 50. The pivoting guides 50 convey the product 12 to servo-driven pacing screws 60. The servo-driven pacing screws 60 convey the product 12 into a corral 44 within the movable downstream portion 40 of laner 10. Servo-driven pacing screws 60 meter product 12, creating substantially uniform space 14 (shown in FIG. 4) between product units 12. Space 14 between the units of product 12 enables product counting. Product counting may be achieved by any known position quantity sensor 16. Examples of a quantity sensor 16 include a photo eye or photocell, a sonic sensor, a vision sensor, a photoelectric sensor, an encoder, or a proximity sensor.

Product metering is achieved by servo-driven pacing screw 60. In at least one embodiment, laner 10 comprises a single servo-driven pacing screw 60, which meters product 12 from a single line of product flow. In some embodiments, the single line of product flow is achieved as described above. In an alternative embodiment, a pair of servo-driven pacing screws 60 is mounted to the proximal portion 52 of the movable downstream portion 40 of laner 10. In at least one embodiment, the two servo-driven pacing screws 60 are identical or symmetric to one another, but the invention also includes servo-driven pacing screws 60 that are different from one another in thread pitch or radius. Thread pitch and radius of the servo-driven pacing screw 60 need not be uniform throughout the length of the servo-driven pacing screw 60. In at least one embodiment, a double servo-driven pacing screw 60 is used in place of a pair of single servo-driven pacing screws 60.

The axis of the servo-driven pacing screw 60 is oriented substantially parallel to the travel direction of the conveyor belt 22. Thread pitch of the servo-driven pacing screw 60 is sufficient to accommodate a unit of product 12. As servo-driven pacing screw 60 turns, thread 58 of servo-driven pacing screw 60 engages a unit of product 12 and conveys product 12 along the axis of the servo-driven pacing screw 60 in the direction of travel of conveyor belt 22. In some embodiments, the servo-driven pacing screws 60 insure that product in left lane 36 is aligned in time and position with product in right lane 38 as product 12 enters corral 44. In at least one embodiment, servo-driven pacing screws 60 also insure product 12 is aligned 90 degrees to the direction of travel of conveyor belt 22. Proper product alignment avoids machine jams downstream.

The rotational speed of servo-driven pacing screw 60 is controlled. In some embodiments, rotation of servo-driven pacing screw 60 is controlled by a servo-driven screw motor 62. Rotation of servo-driven pacing screw 60 is reduced or stopped to allow product 12 from the pivoting guide lanes 50 to fill the voids 61 created by the thread 58 of servo-driven pacing screw 60. When the servo-driven pacing screw 60 is primed with product 12, servo-driven screw motor 62 accelerates rotation of servo-driven pacing screw 60 so that the axial velocity of product 12 matches the speed of the conveyor belt 22. If product prime of the servo-driven pacing screw 60 is lost, servo-driven screw motor 62 decelerates or stops the rotation of servo-driven pacing screw 60. When backpressure of product infeed is reestablished, servo-driven screw motor 62 resumes rotation of servo-driven pacing screw 60.

In at least one embodiment, the two servo-driven pacing screws 60 are geared together and feed out cups/sleeves with a space 14 of approximately two inches (¼ to ½ of the diameter or length of product). The space 14 between products 12 enables a sensor 16 to count and track product distribution. In addition, by providing the product flow with uniform spacing, the laner 10 is capable of advancing product through the laner at speeds much greater than would otherwise be possible. Absent such spacing provided by the operation of pacing screw 60, the product 12 can potentially stack-up into a slug, which prevents efficient counting and advancement.

In some embodiments the two servo-driven pacing screws 60 are configured and controlled so that in corral 44 the position of product 12 in left lane 36 matches the position of product 12 in right lane 38 with regard to placement on conveyor belt 22. Aligning product 12 in lanes 36, 38 prevents products 12 from spinning out at the end portion 56 of the extending guides 54 as the movable downstream portion 40 of the laner 10 is moved. If product 12 in the left lane 36 is not aligned with product 12 in the right lane 38, product 12 in the trailing lane may make undesired contact with the end portion 56 of the extending guides 54 as the laner 10 is repositioned by the motors 26, 28. In some embodiments, a 2-D laser scanner or other sensor actively balances the lanes by providing feedback to servo-driven screw motors 62. In response to sensor feedback, servo-driven screw motors 62 control the rotation of each servo-driven pacing screw 60 independently so that position of product 12 in lanes 36, 38 is matched in the corral 44 of the movable downstream portion 40 of laner 10.

Servo-driven pacing screw 60 delivers product 12 onto conveyor belt 22. Conveyor belt 22 carries product 12 away from the servo-driven pacing screw 60. As product 12 moves away from the servo-driven pacing screw 60, the metered product 12 is contained within the downstream corral 44 of the laner 10. Corral 44 of laner 10 has a pair of extendable guides 54. One laner guide 54 is mounted to either side of the corral 44. A quantity sensor 16 counts the product 12 as the product flows through the corral 44.

Once the proper count of product 12 has been reached, laner 10 prepares for repositioning the movable downstream portion 40 of the laner 10 so that product flow can be redirected to a new position on the conveyor belt 22. In some embodiments, the position of movable downstream portion 40 of laner 10 is maintained as the extending guides 54 extend and accelerate to match the speed of conveyor belt 22. Once the speed of extending guides 54 matches the speed of conveyor belt 22, lateral motor 26 moves laner 10 across conveyor belt 22 while continuing to extract extending guides 54 at the same speed as the conveyor belt 22. In at least one embodiment, stream-wise servo motor 28 moves laner 10 along conveyor belt 22 as lateral motor 26 moves laner 10 across conveyor belt 22. In at least one embodiment, feedback from stream-wise motor 28 is used to adjust extraction speed of extending guides 54 to compensate for laner displacement due to lateral motor 26. In this way, extending guides 54 keep pace with product 12. As laner 10 moves across conveyor belt 22, the lateral surface 55 of extending guides 54 pushes product 12 to a new position on the conveyor belt 22. In this way, laner 10 repositions product flow without interrupting product flow and without harmful contact with the laner 10, where harmful contact is contact that misaligns or damages product 12.

In some embodiments, laner 10 comprises a third extending guide 54 that is located centrally within corral 44. In at least one embodiment, the three extending guides 54 extend in unison, as described above, thereby forming two parallel lanes downstream of corral 44. These lanes formed by extending guides 54 confine product 12 and prevent product 12 from toppling as the movable downstream portion 40 of laner 10 moves laterally across conveyor belt 22. An alternative embodiment of the invention comprises a pair of extending guides 54 on the sides of corral 44 and a fixed central wall (not shown) that is located between the extending guides 54 but the fixed central wall does not extend in unison with extending guides 54.

Once the stream of product 12 exiting the movable downstream portion 40 of laner 10 is properly aligned on conveyor belt 22, the extending guides 54 decelerate and stop in the fully extended position. The extending guides 54 then retract quickly and the cycle is complete. In at least one embodiment, the servo-driven pacing screws 60 continue to meter out product 12 during repositioning of the movable downstream portion 40 of the laner 10.

Figure 2:
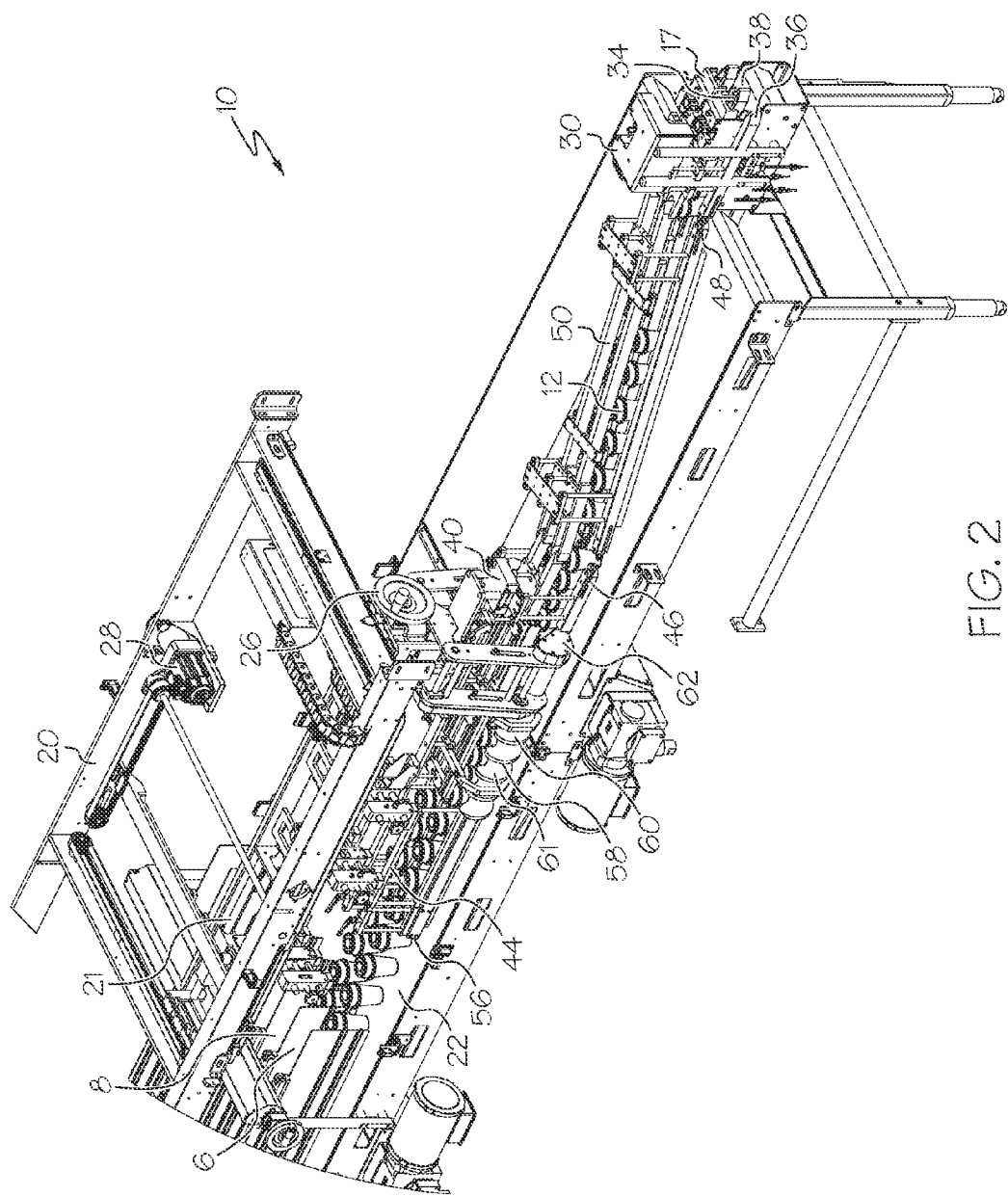
FIG. 2 is a perspective view of an embodiment depicted in FIG. 1.

As shown in FIG. 2, after the lateral movement of movable downstream portion 40 of laner 10 is complete, extending guides 54 retract and conveyor belt 22 conveys product 12 into the two left most downstream lanes 6, 8. Sensor 16 counts product 12 flowing into the two left most lanes 6, 8, as described above.

Figure 3:
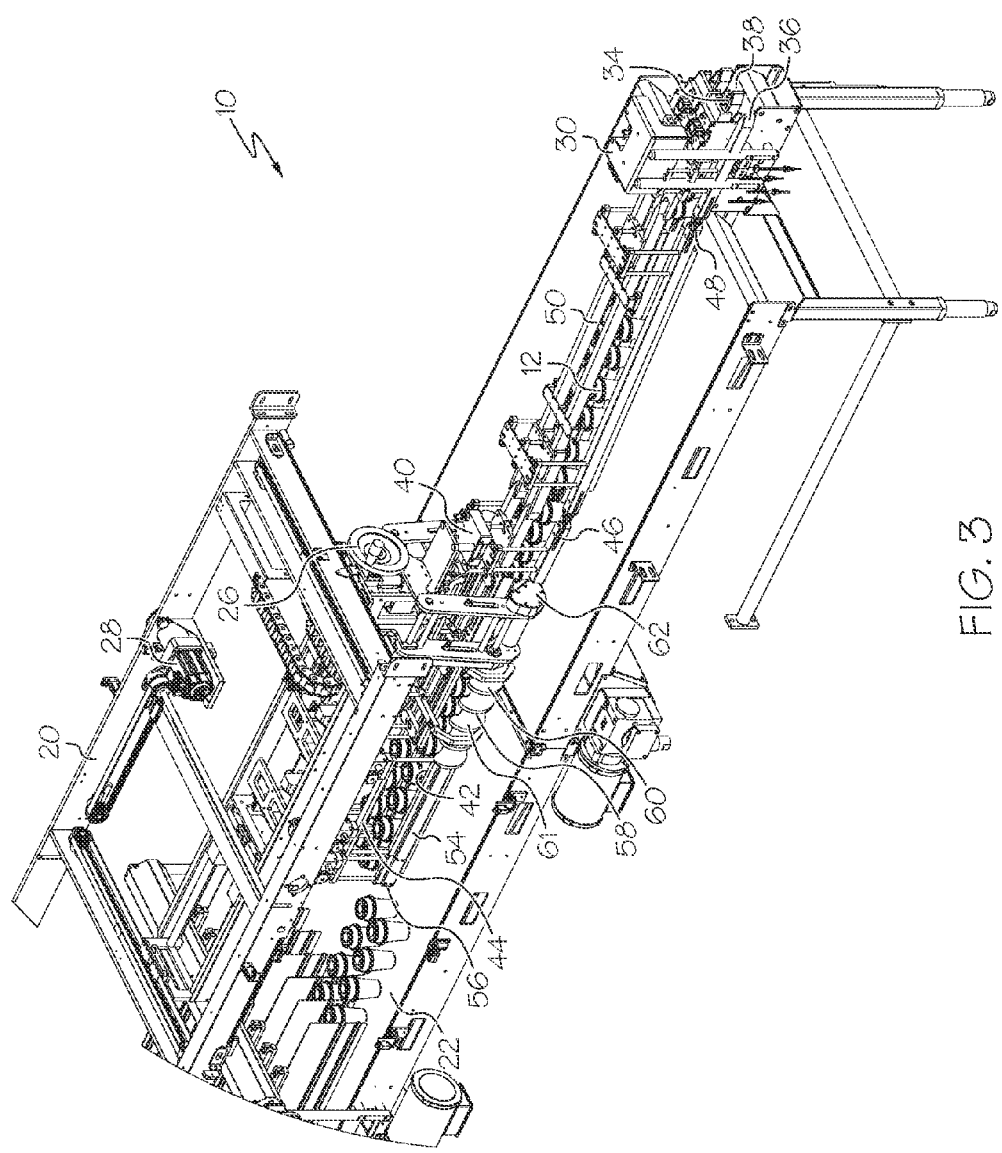
FIG. 3 is a perspective view of an embodiment depicted in FIG. 1.

As shown in FIG. 3, once the proper product count is achieved, servo motors 26, 28 move the movable downstream portion 40 of laner 10 to a new position on conveyor belt 22. In some embodiments, extending guides 54 extend again to keep pace with product 12 that has left corral 44 as motors 26, 28 move the movable downstream portion 40 of laner 10. In this way, the invention enables the movable downstream portion 40 of laner 10 to be repositioned without interrupting product flow. Feedback control of the servo-driven screw motors 62 insures proper alignment of product 12 and avoids harmful contact of laner 10 with product 12, as described above.

Figure 4:
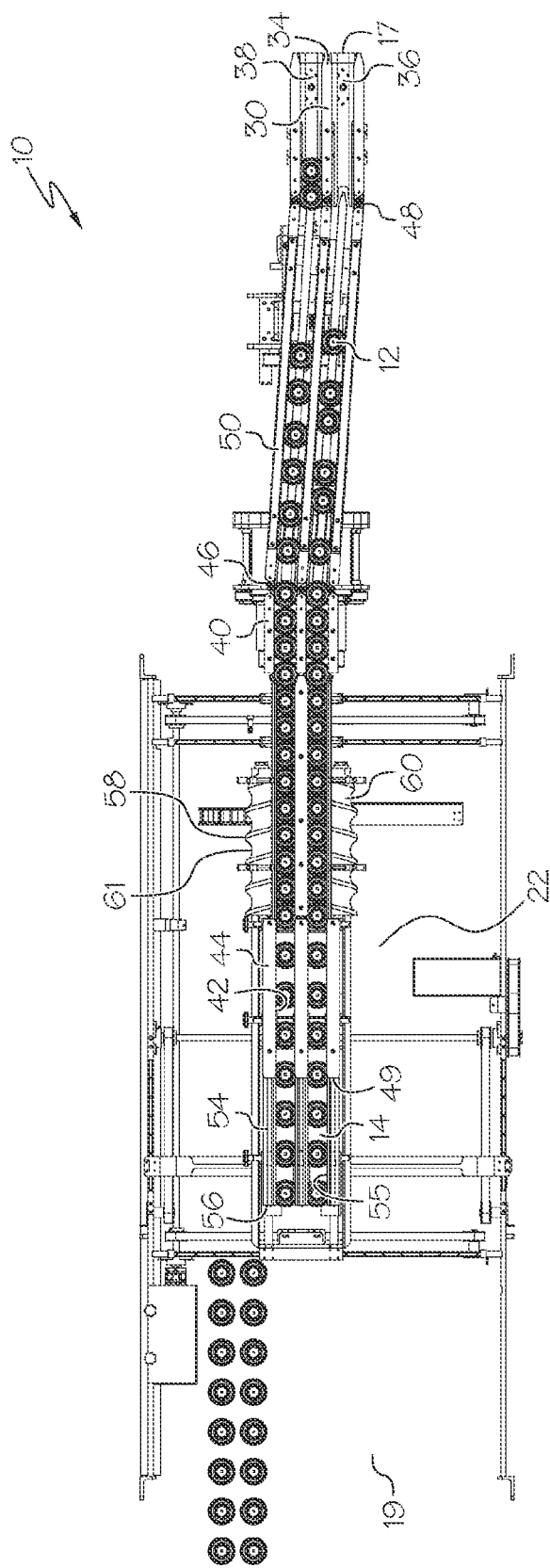
FIG. 4 is a top view of an embodiment depicted in FIG. 1.

A top view of an embodiment of laner 10 is shown in FIG. 4. Product 12 enters the fixed upstream portion 30 of laner 10 at an entrance 17 of laner 10. Product 12 exits laner 10 at an exit 19 of laner 10. Product 12 enters the laner at a random rate as illustrated by the uneven spacing of product 12 within the pivoting guide lane 50. Pivoting guide 50 conveys product 12 to the movable downstream portion 40 of laner 10. Product 12 accumulates upstream of servo-driven pacing screw 60, establishing a back pressure of product 12 on servo-driven pacing screw 60. Thread 58 of servo-driven pacing screw 60 engages product 12 and conveys product 12 toward conveyor belt 22. Thread 58 is constructed and arranged to form voids 61 that accommodate and properly align product 12 relative to conveyor belt 22. As discussed above, servo-driven screw motors 62 control rotation of servo-driven pacing screw 60 so that product 12 is delivered to conveyor belt 22 at a speed that matches the speed of conveyor belt 22 and with a space 14 interposed between adjacent units of product 12.

In some embodiments of the invention, lateral movement of the movable downstream portion 40 of laner 10 occurs without deploying extending guides 54. In such embodiments, the inside surface 42 of corral 44 pushes product 12 into place as the movable downstream portion 40 of laner 10 moves laterally across conveyor belt 22.

The invention further contemplates embodiments where lateral movement of movable downstream portion 40 of laner 10 occurs when extending guides 54 are deployed an intermediate amount between the fully extended and fully retracted positions of the extending guides 54.

In addition to the exemplary embodiments shown, one of ordinary skill in the art will understand that the present laner 10 and its various components can be assembled in a variety of manners and in a variety of configurations.

The above disclosure is intended to be illustrative and not exhaustive. The description will suggest many variations and alternatives to those of ordinary skill in the art. All of these alternatives and variations are intended to be included within the scope of the attached claims. Those familiar with the art many recognize other equivalents to the specific embodiments described herein which equivalents are also intended to be encompassed by the claims attached hereto.

The invention claimed is:

1. A laner apparatus for diverting product to one of a plurality of lanes, the laner apparatus comprising:
   an entrance constructed and arranged to receive a plurality of products from an upstream processing line;
   a movable portion;
   a pivoting guide having a distal end and a proximal end, the distal end of the pivoting guide being attached to the entrance, the proximal end of the pivoting guide being attached to the movable portion; and
   at least one pacing screw attached to the movable portion, the at least one pacing screw having a thread, the thread having a pitch and a radius, the pitch and radius being selected to accommodate a unit of product between two axially adjacent portions of the thread; and
   a conveyor belt for receiving product metered by the at least one pacing screw, the conveyor belt being positioned downstream from the pivoting guide;
   a corral attached to the movable portion and downstream of the at least one pacing screw, the corral having two opposing ends and two opposing sides, the two opposing sides defining a channel between the two opposing ends of the corral, each of the two opposing sides having an interior surface and an exterior surface; and a plurality of extending guides, each extending guide having a fixed portion and a movable portion, the fixed portion being attached to the exterior surface of one of the two opposing sides of the corral, the movable portion being slidably coupled to the fixed portion of the extending guide;

wherein the plurality of extending guides have an extended position and a retracted position, the extending guides configured to extend to the extended position before lateral movement of the movable portion to a new position and retract to retracted position after lateral movement of the movable portion to the new position.

2. The laner apparatus of claim 1 further comprising a servo-motor that controls the rotation of the at least one pacing screw.

3. The laner apparatus of claim 1 where the movable portion is suspended from an open frame by a rail, the open frame mounted above the conveyor belt and the rail oriented parallel to the conveyor belt, wherein the movable portion is movable along the rail in a direction parallel to the conveyor belt, and the rail is movable in a direction perpendicular to the conveyor belt, a first servo motor controlling movement of the movable portion in, and a second servo motor controlling movement of the rail.

4. The laner apparatus of claim 1 wherein the entrance further comprises a central wall that divides the entrance into two parallel lanes of product flow.

5. The laner apparatus of claim 1 wherein the at least one pacing screw is placed between the pivoting guide and the corral.

6. The laner apparatus of claim 5 wherein the at least one pacing screw is a pair of pacing screws wherein each pacing screw controls flow of an independent stream of product.

7. The laner apparatus of claim 1, wherein the at least one pacing screw is configured to rotate when primed with product.

8. The laner apparatus of claim 1,
wherein the at least one pacing screw is configured for variable rotation, wherein when the at least one pacing screw is primed, the at least one pacing screw is configured to convey product at an axial velocity matching a speed of the conveyor belt.

9. The laner apparatus of claim 1,
wherein the plurality of extending guides are configured to extend to the extended position at a speed equal to a speed of the conveyor belt.

10. A laner apparatus for diverting product to one of a plurality of lanes, the laner apparatus comprising:
an entrance constructed and arranged to receive a plurality of products from an upstream processing line;
a movable portion;
a pivoting guide having a distal end and a proximal end, the distal end of the pivoting guide being attached to the entrance, the proximal end of the pivoting guide being attached to the movable portion; and
at least one pacing screw attached to the movable portion, the at least one pacing screw having a thread, the thread having a pitch and a radius, the pitch and radius being selected to accommodate a unit of product between two axially adjacent portions of the thread;
a conveyor belt for receiving product metered by the at least one pacing screw, the conveyor belt being positioned downstream from the pivoting guide;
a corral attached to the movable portion and downstream of the at least one pacing screw, the corral having two opposing ends and two opposing sides, the two opposing sides defining a channel between the two opposing ends of the corral, each of the two opposing sides having an interior surface and an exterior surface; and
a plurality of extending guides, each extending guide having a fixed portion and a movable portion, the fixed portion being attached to the exterior surface of one of the two opposing sides of the corral, the movable portion being slidably coupled to the fixed portion of the extending guide;
wherein the plurality of extending guides are configured to extend to an extended position at a speed equal to a speed of the conveyor belt.

11. The laner apparatus of claim 10, further comprising a servo-motor that controls the rotation of the at least one pacing screw.

12. The laner apparatus of claim 10, where the movable portion is suspended from an open frame by a rail, the open frame mounted above the conveyor belt and the rail oriented parallel to the conveyor belt, wherein the movable portion is movable along the rail in a direction parallel to the conveyor belt, and the rail is movable in a direction perpendicular to the conveyor belt, a first servo motor controlling movement of the movable portion in, and a second servo motor controlling movement of the rail.

13. The laner apparatus of claim 10, wherein the entrance further comprises a central wall that divides the entrance into two parallel lanes of product flow.

14. The laner apparatus of claim 10, the extending guides configured to extend to the extended position before lateral movement of the movable portion to a new position and retract to a retracted position after lateral movement of the movable portion to the new position.

15. The laner apparatus of claim 10, wherein the at least one pacing screw is placed between the pivoting guide and the corral.

16. The laner apparatus of claim 15, wherein the at least one pacing screw is a pair of pacing screws wherein each pacing screw controls flow of an independent stream of product.

17. The laner apparatus of claim 10, wherein the at least one pacing screw is configured to rotate when primed with product.

18. The laner apparatus of claim 10,
wherein the at least one pacing screw is configured for variable rotation, wherein when the at least one pacing screw is primed, the at least one pacing screw is configured to convey product at an axial velocity matching a speed of the conveyor belt.

* * * * *